US012659801B2

(12) United States Patent
Wu et al.

(10) Patent No.: US 12,659,801 B2
(45) Date of Patent: Jun. 16, 2026

(54) CONFIGURING A PREAMBLE FOR TRIGGER-BASED PROTOCOL DATA UNIT

(71) Applicant: Apple Inc., Cupertino, CA (US)

(72) Inventors: Tianyu Wu, Fremont, CA (US); Jinjing Jiang, San Jose, CA (US); Jarkko Lauri Sakari Kneckt, Los Gatos, CA (US); Yong Liu, Campbell, CA (US); Lochan Verma, Danville, CA (US); Qi Wang, Sunnyvale, CA (US); Su Khiong Yong, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 628 days.

(21) Appl. No.: 17/508,876

(22) Filed: Oct. 22, 2021

(65) Prior Publication Data

US 2022/0132371 A1     Apr. 28, 2022

Related U.S. Application Data

(60) Provisional application No. 63/105,817, filed on Oct. 26, 2020.

(51) Int. Cl.
*H04W 28/06*     (2009.01)
*H04L 69/22*     (2022.01)
*H04L 69/323*     (2022.01)

(52) U.S. Cl.
CPC ........... *H04W 28/065* (2013.01); *H04L 69/22* (2013.01); *H04L 69/323* (2013.01)

(58) Field of Classification Search
USPC ........................................................ 370/328
See application file for complete search history.

(56) References Cited

U.S. PATENT DOCUMENTS

| 2017/0325202 | A1* | 11/2017 | Verma | .................... | H04W 16/14 |
| 2018/0184453 | A1* | 6/2018 | Viger | .................. | H04W 74/085 |
| 2019/0141570 | A1* | 5/2019 | Verma | ................. | H04W 28/065 |

(Continued)

FOREIGN PATENT DOCUMENTS

| CN | 109218243 | 1/2019 |
| CN | 109417817 | 3/2019 |

(Continued)

OTHER PUBLICATIONS

Extended European Search Report and Written Opinion in European Appln. No. 21204477.0, dated Mar. 21, 2022, 13 pages.

(Continued)

*Primary Examiner* — Ayman A Abaza
*Assistant Examiner* — Hooman Houshmand
(74) *Attorney, Agent, or Firm* — Fish & Richardson P.C.

(57)     ABSTRACT

Techniques for trigger-based transmission in a wireless network include receiving, at a first wireless device, a trigger signal including an indication of a first value for a parameter of a trigger-based physical layer protocol data unit (TB PPDU) transmission to a second wireless device, selecting, by the first wireless device, a second value for the parameter of the TB PPDU transmission, wherein the second value for the parameter is different from the first value for the parameter, and transmitting, by the first wireless device and to the second wireless device, the TB PPDU transmission using the second value for the parameter.

17 Claims, 6 Drawing Sheets

(56)     References Cited

U.S. PATENT DOCUMENTS

| | | | | |
|---|---|---|---|---|
| 2019/0141717 | A1* | 5/2019 | Yang | H03M 13/1102 |
| 2019/0253984 | A1 | 8/2019 | Cariou et al. | |
| 2019/0261369 | A1* | 8/2019 | Verma | H04B 7/0619 |
| 2020/0014509 | A1* | 1/2020 | Asterjadhi | H04L 5/0041 |
| 2020/0382998 | A1* | 12/2020 | Cao | H04L 1/0041 |
| 2021/0045151 | A1* | 2/2021 | Chen | H04W 74/002 |
| 2021/0351894 | A1* | 11/2021 | Lin | H04W 28/20 |
| 2023/0110435 | A1* | 4/2023 | Yu | H04L 5/0094 |
| | | | | 370/329 |
| 2023/0354273 | A1* | 11/2023 | Ko | H04L 1/0061 |

FOREIGN PATENT DOCUMENTS

| | | |
|---|---|---|
| CN | 109586889 | 4/2019 |
| CN | 111247858 | 6/2020 |
| EP | 3613251 | 2/2020 |
| WO | WO 2016/176110 | 11/2016 |
| WO | WO 2017/027348 | 2/2017 |
| WO | WO 2018/195079 | 10/2018 |
| WO | WO 2019/007379 | 1/2019 |

OTHER PUBLICATIONS

Gao et al., "Study on Key Technology of Wireless Body Area Network (WBAN) Application," Computer & Digital Engineering, 2013, 41(2): 327-329 (with machine translation).

Intel Corporation, "Channel access mechanism for NR-unlicensed," 3GPP TSG RAN WG1 Meeting #99, R1-1912197, Nov. 18-22, 2019, Reno, Nevada, 30 pages.

* cited by examiner

500

| L-STF | L-LTF | L-SIG | RL-SIG | U-SIG | EHT-STF | EHT-LTF(S) | DATA PORTION OF EHT TB PPDU |
|-------|-------|-------|--------|-------|---------|------------|------------------------------|
| 502 | 504 | 506 | 508 | 510 | 512 | 514 | 516 |

600 ⌐

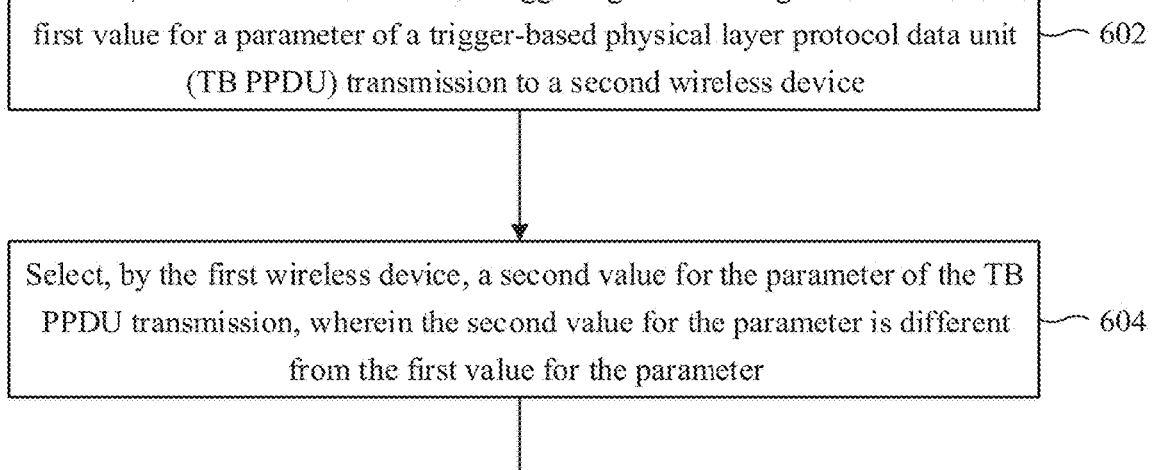

Receive, at a first wireless device, a trigger signal including an indication of a first value for a parameter of a trigger-based physical layer protocol data unit (TB PPDU) transmission to a second wireless device ⌐ 602

Select, by the first wireless device, a second value for the parameter of the TB PPDU transmission, wherein the second value for the parameter is different from the first value for the parameter ⌐ 604

Transmit, by the first wireless device and to the second wireless device, the TB PPDU transmission using the second value for the parameter ⌐ 606

*FIG. 6*

CONFIGURING A PREAMBLE FOR TRIGGER-BASED PROTOCOL DATA UNIT

PRIORITY

This application claims priority to and the benefit of U.S. Provisional Patent Application No. 63/105,817, filed Oct. 26, 2020, the entire contents of which is incorporated herein by reference.

TECHNICAL FIELD

This disclosure relates generally to wireless communications.

BACKGROUND

A wireless local area network (WLAN) typically includes an access point (AP) that provides one or more stations (STAs) with access to another network, such as the Internet. In 802.11ax, a WLAN standard defined by Institute of Electrical and Electronics Engineers (IEEE), Orthogonal Frequency Division Multiple Access (OFDMA) was introduced to enable simultaneous communications between an AP and multiple STAs. OFDMA divides the available physical spectrum into multiple orthogonal sub-channels, or resource units (RUs), which can be allocated to different users (e.g., STAs). Under the standard, an AP coordinates multiuser OFDMA by broadcasting a trigger frame which, among other things, allocates a RU to each participating STA. Each STA responds to the trigger frame by transmitting a physical layer convergence procedure (PLCP) protocol data unit (PPDU) to the AP using the allocated RU.

SUMMARY

In general, in a first aspect, a method includes receiving, at a first wireless device, a trigger signal including an indication of a first value for a parameter of a trigger-based physical layer protocol data unit (TB PPDU) transmission to a second wireless device. The method further includes selecting, by the first wireless device, a second value for the parameter of the TB PPDU transmission, the second value for the parameter being different from the first value for the parameter. The first wireless device transmits, to the second wireless device, the TB PPDU transmission using the second value for the parameter.

In general, in a second aspect, a first wireless device includes one or more processors and a non-transitory computer-readable storage medium storing instructions which, when executed by the one or more processors, cause the one or more processors to perform operations including receiving a trigger signal including an indication of a first value for a parameter of a TB PPDU transmission to a second wireless device. The operations further include selecting a second value for the parameter of the TB PPDU transmission, the second value for the parameter being different from the first value for the parameter. The operations further include transmitting, to the second wireless device, the TB PPDU transmission using the second value for the parameter.

In general, in a third aspect, a processor for a first wireless device includes circuitry to execute one or more instructions which, when executed, cause the processor to perform operations including receiving a trigger signal including an indication of a first value for a parameter of a TB PPDU transmission to a second wireless device. The operations further include selecting a second value for the parameter of the TB PPDU transmission, the second value for the parameter being different from the first value for the parameter. The operations further include causing transmission of the TB PPDU transmission to the second wireless device using the second value for the parameter.

In general, in a fourth aspect, a non-transitory computer-readable medium stores instructions which, when executed by one or more processors, cause the one or more processors to perform operations including receiving a trigger signal including an indication of a first value for a parameter of a TB PPDU transmission to a second wireless device. The medium stores further instructions which, when executed, cause the one or more processors to select a second value for the parameter of the TB PPDU transmission, the second value for the parameter being different from the first value for the parameter. The medium stores further instructions which, when executed, cause the one or more processors to cause transmission of the TB PPDU transmission to the second wireless device using the second value for the parameter.

In general, in a fifth aspect, a method includes transmitting, to a wireless device, a trigger signal including an indication of a first value for a parameter of a TB PPDU transmission by the wireless device. The operations further include receiving, from the wireless device, the TB PPDU transmission using a second value for the parameter that is different from the first value for the parameter, the second value for the parameter being selected by the wireless device.

In general, in a sixth aspect, a first wireless device includes one or more processors and a non-transitory computer-readable storage medium storing instructions which, when executed by the one or more processors, cause the one or more processors to perform operations including transmitting, to a second wireless device, a trigger signal including an indication of a first value for a parameter of a TB PPDU transmission by the second wireless device. The operations further include receiving, from the second wireless device, the TB PPDU transmission using a second value for the parameter that is different from the first value for the parameter, the second value for the parameter being selected by the second wireless device.

In general, in a seventh aspect, a processor for a first wireless device includes circuitry to execute one or more instructions which, when executed, cause the processor to perform operations including transmitting, to a second wireless device, a trigger signal including an indication of a first value for a parameter of a TB PPDU transmission by the second wireless device. The operations further include receiving, from the second wireless device, the TB PPDU transmission using a second value for the parameter that is different from the first value for the parameter, the second value for the parameter being selected by the second wireless device.

In general, in an eighth aspect, a non-transitory computer-readable medium stores instructions which, when executed by one or more processors, cause the one or more processors to perform operations including causing transmission of a trigger signal to a wireless device, the trigger signal including an indication of a first value for a parameter of a TB PPDU transmission by the wireless device. The operations further include receiving, from the wireless device, the TB PPDU transmission using a second value for the parameter that is different from the first value for the parameter, the second value for the parameter being selected by the second wireless device.

In general, in a ninth aspect, combinable with any of the first through eighth aspects, the parameter includes a physical layer parameter for the TB PPDU.

In general, in a tenth aspect, combinable with any of the first through ninth aspects, the parameter includes a resource unit (RU) for the TB PPDU transmission.

In general, in an eleventh aspect, combinable with any of the first through tenth aspects, the first value represents an allocated RU size for the first wireless device, and the second value represents a responding RU size selected by the first wireless device that is less than the allocated RU size.

In general, in a twelfth aspect, combinable with any of the first through eleventh aspects, the responding RU size is at least one half of the allocated RU size.

In general, in a thirteenth aspect, combinable with any of the first through twelfth aspects, the operations include selecting, by the first wireless device, a multi-RU combination to produce the second value representing the responding RU size.

In general, in a fourteenth aspect, combinable with any of the first through thirteenth aspects, the operations include signaling an indication of the second value for the parameter in a preamble of the TB PPDU transmission.

In general, in a fifteenth aspect, combinable with any of the first through fourteenth aspects, the indication for the second value for the parameter is signaled in a U-SIG field of the preamble of the TB PPDU transmission.

In general, in a sixteenth aspect, combinable with any of the first through fifteenth aspects, the indication of the second value for the parameter is signaled relative to the first value for the parameter.

In general, in a seventeenth aspect, combinable with any of the first through sixteenth aspects, the indication of the second value for the parameter includes an indication of a predefined mode representing the second value for the parameter.

In general, in an eighteenth aspect, combinable with any of the first through seventeenth aspects, the operations include determining, based on the trigger signal, that the first wireless device is the only device scheduled for TB PPDU transmission to the second wireless device in a particular channel, and in response to the determination, selecting, by the first wireless device, the second value for the parameter of the TB PPDU transmission.

In general, in a nineteenth aspect, combinable with any of the first through eighteenth aspects, the parameter includes one of a RU, a modulation coding scheme (MCS), a number of space time streams (NSTS), a coding type, or a dual sub-carrier modulation (DCM).

In general, in a twentieth aspect, combinable with any of the first through nineteenth aspects, the trigger signal includes an indication of whether the second wireless device is allowed to reconfigure the first value for the parameter of the TB PPDU.

The details of one or more implementations are set forth in the accompanying drawings and the description below. The techniques described here can be implemented by one or more wireless communication systems, components of a wireless communication system (e.g., a station, an access point, a user equipment, a base station, etc.), or other systems, devices, methods, or non-transitory computer-readable media, among others. Other features and advantages will be apparent from the description and drawings, and from the claims.

BRIEF DESCRIPTION OF DRAWINGS

FIG. 6 illustrates an example process for configuration of TB PPDU parameters by a triggered STA in accordance with some implementations of the present disclosure.

Like reference symbols in the various drawings indicate like elements.

DETAILED DESCRIPTION

The techniques described here enable a wireless device to configure parameters for an uplink trigger-based physical layer protocol data unit (TB PPDU) transmission. For example, a wireless device can receive a trigger from a network that assigns values for one or more parameters (e.g., a resource unit (RU) and one or more physical layer (PHY) parameters) for a subsequent TB PPDU transmission. If the wireless device is the only device triggered for transmission on a particular sub-channel, the wireless device is allowed to modify some or all of the received parameter values, such as those for the RU, modulation coding scheme (MCS), forward error control (FEC) coding type, number of space time streams (NSTS), dual sub-carrier modulation (DCM), or combinations of them, among others. The wireless device can then transmit the TB PPDU using the modified parameter values. The modified parameter values selected by the wireless device can be different than those assigned by the network (e.g., an access point), thereby enabling the wireless device to account for local information regarding link quality, buffered data, and channel status when selecting values for the TB PPDU transmission. In this manner, the efficiency, throughput, and reliability of TB PPDU transmissions are increased. The present disclosure also provides techniques for enabling the triggered wireless device to efficiently signal the selected parameter values in a way that is compatible with the existing IEEE 802.11 WLAN framework.

Figure 1:
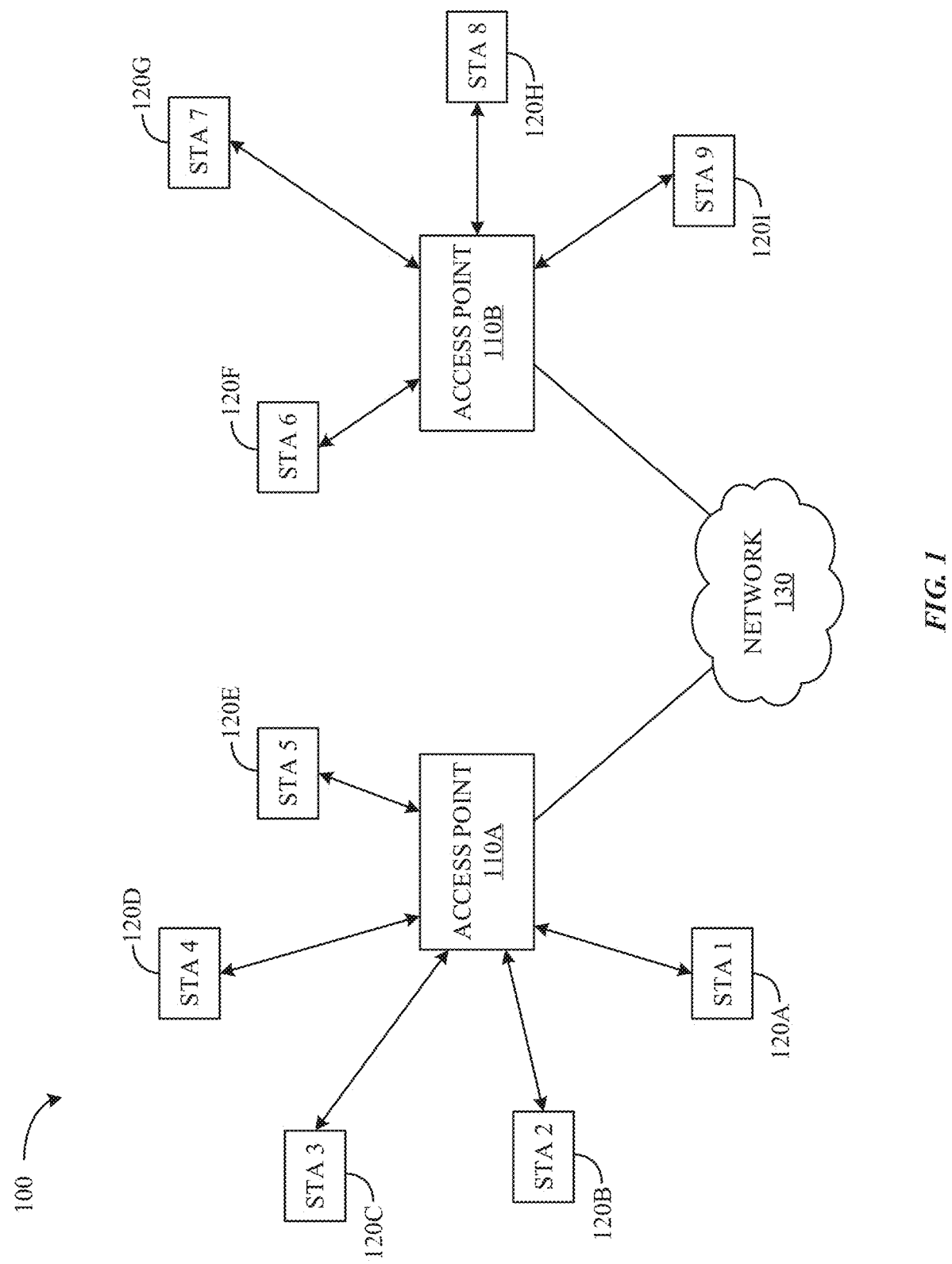
FIG. 1 illustrates an example wireless communication network in accordance with some implementations of the present disclosure.

FIG. 1 illustrates an example of a wireless communication network 100. In this example, the network 100 includes access points (APs) 110a and 110b configured to wirelessly communicate with one or more stations (STAs) 120a-120i (referred to collectively as "STAs 120"). For example, AP 110a is shown in wireless communication with STAs 120a-120e, and AP 110b is shown in wireless communication with STAs 120f-120i. Each of the APs 110a and 110b (referred to collectively as "APs 110") are coupled to a network 130, such as the Internet or another interconnected network of computerized devices, thereby providing the STAs 120 with access to the network 130. Note that the wireless communication network 100 can include additional or fewer APs or STAs without departing from the scope of the present disclosure.

Figure 2:
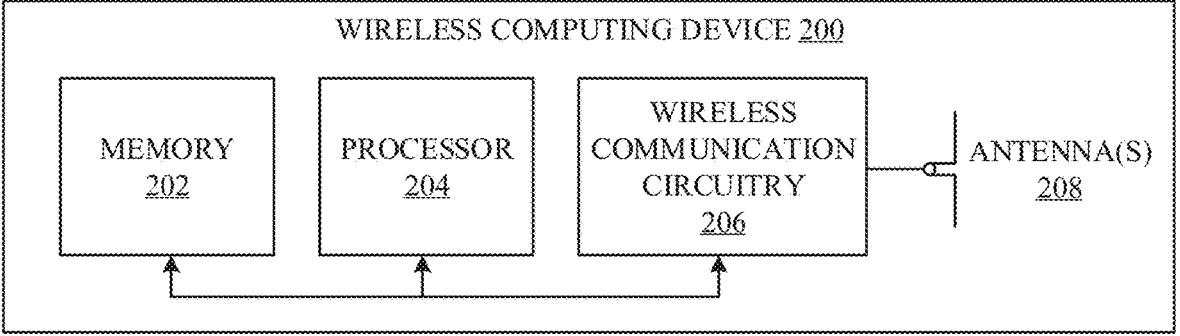
FIG. 2 illustrates an example wireless computing device in accordance with some implementations of the present disclosure.

Each of the APs 110 and STAs 120 can be a computing device, such as the wireless computing device 200 of FIG. 2. For example, one or more of the APs 110 or STAs 120, or both, can be a substantially portable wireless computing device, such as a smart phone, a hand-held device, a wearable device (e.g., a smart watch), a tablet, a laptop, or a motor vehicle, among other portable wireless devices. As another example, one or more of the APs 110 or STAs 120, or both, can be a substantially stationary computing device, such as a set top box, a router, a media player (e.g., an audio or audiovisual device), a gaming console, a desktop computer, an appliance, or a base station, among other stationary devices.

In an example, each of the APs 110 include baseband processing circuitry and a radio transceiver. The baseband processing circuitry can be realized by, for example, one or more processors (or processor cores) configured to execute stored program instructions as described herein. In an example, the radio transceiver is configured to: receive baseband downlink signal(s) from the baseband processing circuitry, convert the baseband downlink signal(s) into radio frequency (RF) downlink signal(s), and transmit the RF downlink signal(s) onto a wireless medium using one or more antennas. The radio transceiver is further configured to: receive RF uplink signal(s) from the wireless medium using the one or more antennas, convert the RF uplink signal(s) to baseband uplink signal(s), and provide the baseband uplink signal(s) to the baseband processing circuitry. The radio transceiver can include one or more transmit chains (e.g., one transmit channel per antenna) and one or more receive chains (e.g., one receive chain per antenna).

Similar to the APs 110, each of the STAs 120 can include baseband processing circuitry and a radio transceiver. The baseband processing circuitry can be realized by one or more processors (or processor cores) configured to execute stored program instructions as described herein. In an example, the radio transceiver is configured to: receive baseband uplink signal(s) from the baseband processing circuitry, convert the baseband uplink signal(s) to RF uplink signal(s), and transmit the RF uplink signal(s) onto a wireless medium using one or more antennas. The radio transceiver is further configured to: receive RF downlink signal(s) from the wireless medium using the one or more antennas, convert the RF downlink signal(s) to baseband downlink signal(s), and provide the baseband downlink signal(s) to the baseband processing circuitry. The radio transceiver can include one or more transmit chains (e.g., one transmit channel per antenna) and one or more receive chains (e.g., one receive chain per antenna).

The APs 110 and STAs 120 can communicate using one or more wireless communication techniques. In an example, the APs 110 and STAs 120 communicate using wireless local area networking (WLAN) communication technology (e.g., IEEE 802.11/Wi-Fi based communication) or other techniques based on WLAN wireless communication. In some examples, the APs 110 and STAs 120 communicate using one or more other wireless communication protocols, such as Bluetooth (BT), Bluetooth Low Energy (BLE), near field communication (NFC), GSM, UMTS (WCDMA, TDSCDMA), LTE, LTE-Advanced (LTE-A), 5G NR, 3GPP2 CDMA2000 (e.g., 1xRTT, 1xEV-DO, HRPD, eHRPD), or combinations of them, among other wireless communication protocols.

In an example, each of the APs 110 are configured to transmit a downlink Orthogonal Frequency Division Multiple Access (OFDMA) signal to one of more of the coupled STAs 120. OFDMA is a technology that allows multiple STAs to transmit frames simultaneously using non-overlapping time-frequency resources. The downlink OFDMA signal can include a trigger frame which, among other things, allocates resources to the one or more STAs 120. In this example, the STAs 120 are configured to receive and decode the downlink OFDMA signal (or a portion of the downlink OFDMA signal) from the APs 110. In response, the STAs 120 can generate and transmit a trigger-based (TB) physical layer convergence procedure (PLCP) protocol data unit (PPDU) to the triggering AP 110, as describe herein.

In an example, each of the APs 110 are configured to perform downlink spatial multiplexing to one or more of the coupled STAs 120. Downlink spatial multiplexing refers to the ability to transmit two or more spatial streams to a STA 120, where the two or more spatial streams are superposed on the same set of time-frequency resources.

FIG. 2 illustrates an example wireless computing device 200 configured for use in conjunction with various aspects of the present disclosure. In this example, the device 200 includes a memory 202, a processor 204, wireless communication circuitry 206, and one or more antennas 208. The processor 204 is configured to execute instructions and manipulate data to perform operations of the device 200, including operations using algorithms, methods, functions, processes, flows, and procedures as described herein. The processor 204 can be, for example, a central processing unit (CPU), a reduced instruction set computing (RISC) processor, a complex instruction set computing (CISC) processor, a graphics processing unit (GPU), a digital signal processor (DSP) such as a baseband processor, a field-programmable gate array (FPGA), an application-specific integrated circuit (ASIC), a radio-frequency integrated circuit (RFIC), or combinations of them, among other processors. Although illustrated as a single processor 204 in FIG. 2, two or more processors 204 can be used in some implementations.

The processing element 204 can include or be coupled to one or more local and/or system memory elements, such as the memory 202. The memory 202 can include any of a variety of permanent/non-permanent and volatile/non-volatile memory and media devices, and can store instructions and/or data as described herein. For example, memory 202 could be RAM serving as a system memory for processing element 204. Other types of memory and functions are also possible. Although illustrated as a single memory 202 in FIG. 2, two or more memories 202 (of the same or different types) can be used in some implementations of the device 200.

The device 200 also includes wireless communication circuitry 206. In an example, the wireless communication circuitry 206 (sometimes referred to here as a "radio") includes analog and/or digital circuitry components. In general, a radio can include any combination of a baseband processor, analog RF signal processing circuitry (e.g., filters, mixers, oscillators, amplifiers, etc.), and digital processing circuitry (e.g., for digital modulation as well as other digital processing). Similarly, the radio can implement one or more receive and transmit chains using the aforementioned hardware. For example, the wireless device 200 can share one or more parts of a receive chain and/or a transmit chain between one or more wireless communication technologies, such as those discussed above. The wireless communication circuitry can include or be coupled to one or more antennas 208.

Note that the wireless communication circuitry 206 can include a discrete processor or processing element in addition to the processor 204. For example, the processor 204 can be an 'application processor,' while wireless communication circuitry 206 can include its own 'baseband processor.' Alternatively (or in addition), the processor 204 can provide processing capability for the wireless communication circuitry 206. The device 200 can communicate using any of various wireless communication technologies by way of wireless communication circuitry 206 and the antenna(s) 208.

The device 200 can also include any of a variety of other components (not shown) for implementing device functionality, depending on the intended functionality of the device 200, which can include further processing and/or memory elements, one or more power supply elements (which may rely on battery power and/or an external power source), user interface elements (e.g., display, speaker, microphone, camera, keyboard, mouse, touchscreen, etc.), additional communication elements (e.g., antenna(s) for wireless communication, I/O ports for wired communication, communication circuitry/controllers, etc.) and/or any of various other components.

The components of the device 200, such as the memory 202, processor 204, wireless communication circuitry 206, and antenna(s) 208, can be operatively coupled using one or more intra-chip or inter-chip interconnection interfaces. As an example, a USB high-speed inter-chip (HSIC) interface can be provided for inter-chip communications between the processor 204 and the wireless communication circuitry 206. Alternatively (or in addition), a universal asynchronous receiver transmitter (UART) interface, a serial peripheral interface (SPI), inter-integrated circuit (I2C), system management bus (SMBus), and/or any of a variety of other communication interfaces can be used for communications between the memory 202, processor 204, wireless communication circuitry 206, and/or any of various other device components. Other types of interfaces (e.g., peripheral interfaces for communication with peripheral components within or external to device 200, etc.) can also be provided as part of device 200.

Some WLAN systems, such as those implementing the IEEE 802.11ax standard, use techniques such as downlink/uplink multiuser multiple-input/multiple-output (MIMO) and downlink/uplink OFDMA to provide a multiple access scheme and improve network efficiency. In IEEE 802.11ax (sometimes referred to as High Efficiency WLAN (HE WLAN)), a trigger frame can be sent (e.g., by an AP) to initiate uplink data, control, or management frame response(s) from STAs in a subsequent uplink transmission. A trigger frame can include, for example, some or all of the following features: a list of STAs that an AP seeks a response from, resource allocation information for each STA (e.g., a resource unit (RU) allocated to each STA, number of spatial streams, etc.); and/or (c) attributes of the expected uplink frame (e.g., duration, bandwidth, etc.), among other features. In other words, the trigger frame can be used to allocate resources for a subsequent uplink multiuser transmission and to solicit the transmission from the participating stations in response to the trigger frame. An uplink physical layer convergence procedure (PLCP) protocol data unit (PPDU)

(e.g., MU-MIMO or OFDMA) can be sent by the triggered STAs in response to the trigger frame.

Thus, in IEEE 802.11ax, physical layer (PHY) parameters of a trigger-based PPDU (TB PPDU), such as RU allocation, MCS, and number of spatial streams, among others, are controlled by the triggering STA (e.g., the AP). The standard currently does not allow triggered STAs to configure TB PPDU parameters based on, for example, the STA's own information. This is because the pre-HE modulated preamble (sometimes referred to as the "legacy preamble") of TB PPDU can be transmitted by multiple triggered STAs. Since the waveform from different triggered STAs should be identical to avoid interference, the content of legacy preamble (or a portion thereof, such as, e.g., HE-SIG-A or HE-SIG-B) should be identical.

The techniques described here enable a triggered STA to configure its own parameters for an uplink TB PPDU transmission in some instances. For example, if there is a single STA triggered for transmission on a particular subchannel, the STA is allowed to select values for parameters of the TB PPDU transmission, such as the bandwidth (e.g., RU allocation), modulation coding scheme (MCS), forward error control (FEC) coding type, number of space time streams (NSTS), dual sub-carrier modulation (DCM), or combinations of them, among others. The parameter values selected by the triggered STA can be different than those assigned by the triggering STA (e.g., the AP), thereby enabling the triggered STA to account for local information regarding, for example, link quality, buffered data, and channel status, when selecting values for the TB PPDU transmission. In this manner, the efficiency, throughput, and reliability of TB PPDU transmissions are increased. The techniques describe here also enable the triggered STA to efficiently signal the selected parameters values in a way that fits within the existing IEEE 802.11 WLAN framework. In an example, the techniques describe here can be specified in a WLAN standard, such as the IEEE 802.11 standard (including IEEE 802.11be and other revisions of the standard).

Figure 3A:
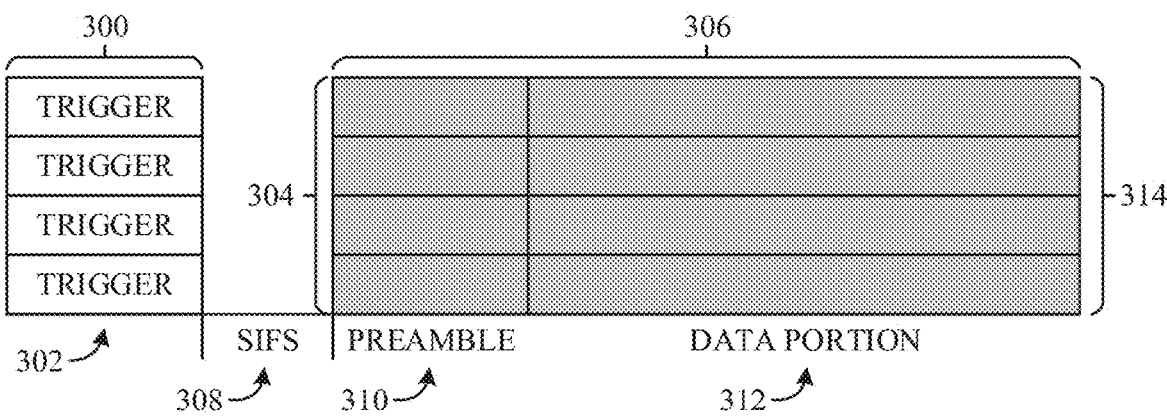
FIG. 3A illustrates an example of single-user trigger-based wireless communication in accordance with some implementations of the present disclosure.
Figure 3B:
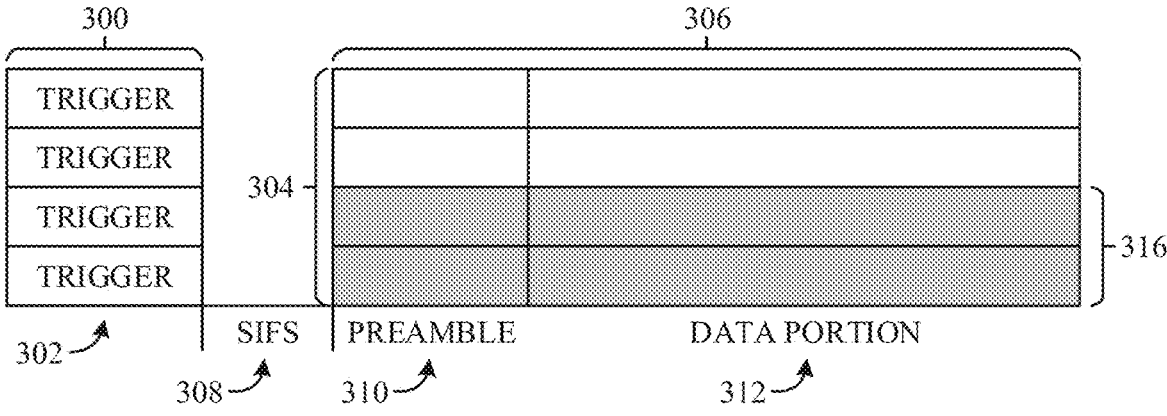
FIG. 3B illustrates an example of single-user trigger-based wireless communication in accordance with some implementations of the present disclosure.
Figure 3C:
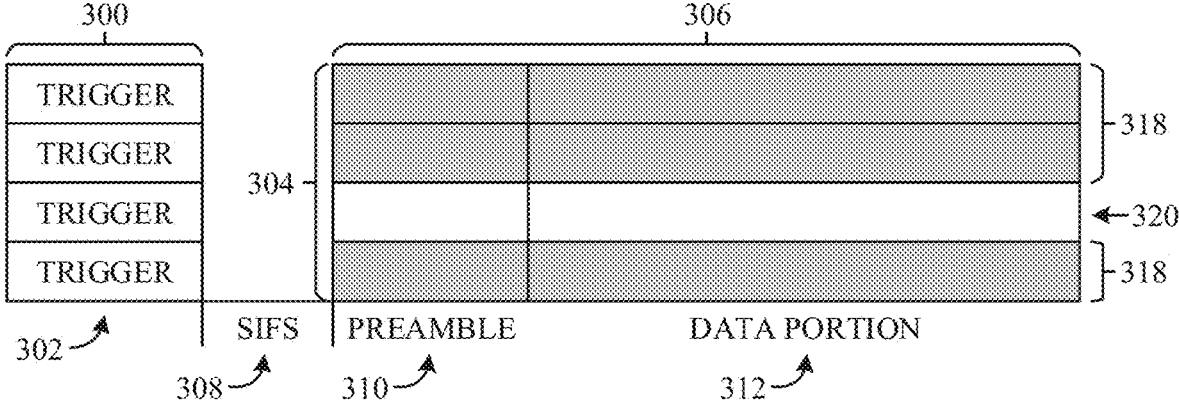
FIG. 3C illustrates an example of single-user trigger-based wireless communication in accordance with some implementations of the present disclosure.

FIGS. 3A-3C illustrate examples of single-user trigger-based wireless communications in accordance with aspects of the present disclosure. In FIG. 3A, a triggering STA (e.g., an AP, such as one of APs 110 shown in FIG. 1) broadcasts a downlink OFDMA signal 300 including a trigger frame 302. The trigger frame 302 identifies the triggered STA (e.g., one of STAs 120 shown in FIG. 1), allocates a RU 304 and other resources (e.g., NSTS) to the triggered STA, and defines various attributes (e.g., MCS, FEC coding type, DCM, etc.) of the TB PPDU 306 to be transmitted by the triggered STA. These resources and attributes can be referred to as "parameters" of the TB PPDU, and to the values assigned in the trigger frame of the downlink OFDMA signal as "parameter values" of the TB PPDU. In this example, the allocated RU 304 is a 996-tone RU occupying a channel bandwidth of 80 MHz, although other RU sizes and channel bandwidths can be used without departing from the scope of the present disclosure.

Once the downlink OFDMA signal 300 including the trigger frame 302 is received, the triggered STA generates the TB PPDU 306 (which includes a preamble 310 and a data portion 312) for uplink transmission to the triggering STA after a short inter-frame space (SIFS) 308. Since the triggered STA is the only STA scheduled for transmission on the 80 MHz channel (or its individual 20 MHz sub-channels) as determined by, for example, the trigger frame 302, channel assessment, or other techniques, the preamble 310 of the TB PPDU 306 is only sent by the triggered STA. As such, the preamble on each of the 20 MHz sub-channels can be different and still avoid interference. Accordingly, the triggered STA can select values for one or more parameters of the TB PPDU 306 and can signal these parameters in the preamble 310 of the TB PPDU 306, as described herein. The parameter values selected by the triggered STA can be different than those assigned by the triggering STA in the trigger frame 302 of the downlink OFDMA signal 300.

In the example of FIG. 3A, the triggered STA chooses to transmit the uplink TB PPDU 306 using a responding RU 314 having the same size (e.g., bandwidth) as the RU 304 allocated by the triggering STA. However, the triggered STA can select values for other parameters, such as NSTS, MCM, FEC coding type, DCM, or combinations of them, among others, that are different than those values assigned by the triggering STA. Referring to FIG. 3B, the triggered STA selects a responding RU 316 that is smaller than (e.g., a subset of) the RU 304 allocated by the triggering STA. For example, the triggered STA can determine that a portion of the allocated RU 304 is in use (e.g., by the triggered STA or other nearby STAs communicating on another wireless network), or that the entire bandwidth of the allocated RU 304 is not needed to transmit the TB PPDU 306, and can select a reduced-size RU 316 in response. The triggered STA can signal the responding RU 316, as well as an indication of any other selected parameter values, in the preamble 310 of the TB PPDU 306.

In FIG. 3C, the triggered STA selects a responding RU 318 that is smaller than the RU 304 allocated by the triggering STA. In this example, the responding RU 318 is a multi-RU combination that includes a combination of a 242-tone RU and a 484-tone RU. To produce the responding RU 318 (e.g., the multi-RU combination), the triggered STA can puncture (e.g., zero out or otherwise forgo transmission) a portion 320 of the allocated RU 304 or otherwise select one or more RUs within the allocated RU 304 to form the responding RU 318. The punctured portion 320 corresponds to a 20 MHz sub-channel in this example, although other portions of the allocated RU can be punctured in other instances. The triggered STA can signal the multi-RU combination, as well as an indication of any other selected parameter values, in the preamble 310 of the TB PPDU 306. In an example, the triggered STA can signal the multi-RU combination by signaling the RU(s) that make up the multi-RU combination, a multi-RU combination mode, or a preamble puncturing pattern, among others. By enabling the triggered STA to configure its own responding RU (e.g., through reducing the allocated RU to a smaller RU or multi-RU combination), the triggered STA is able to transmit the TB PPDU in instances where it previously could not, such as when one of the sub-channels in the allocated RU is determined to be busy (e.g., through clear channel assessment (CCA) or otherwise).

In an example, some restrictions are placed on the triggered STA when selecting the TB PPDU parameters. For example, the configured MCS level and NSTS can be smaller or equal to what the triggering STA indicated in the trigger frame to ensure that the triggering STA can correctly receive the TB PPDU with the target received signal strength indicator (RSSI). In an example, the techniques described here can be applied in other trigger-based wireless communication networks. For example, the techniques described here can enable a triggered device to select a number of constellation points (e.g., 16, 32, 64, 128, 256, etc.) in a network using quadrature amplitude modulation (QAM).

Figure 4A:
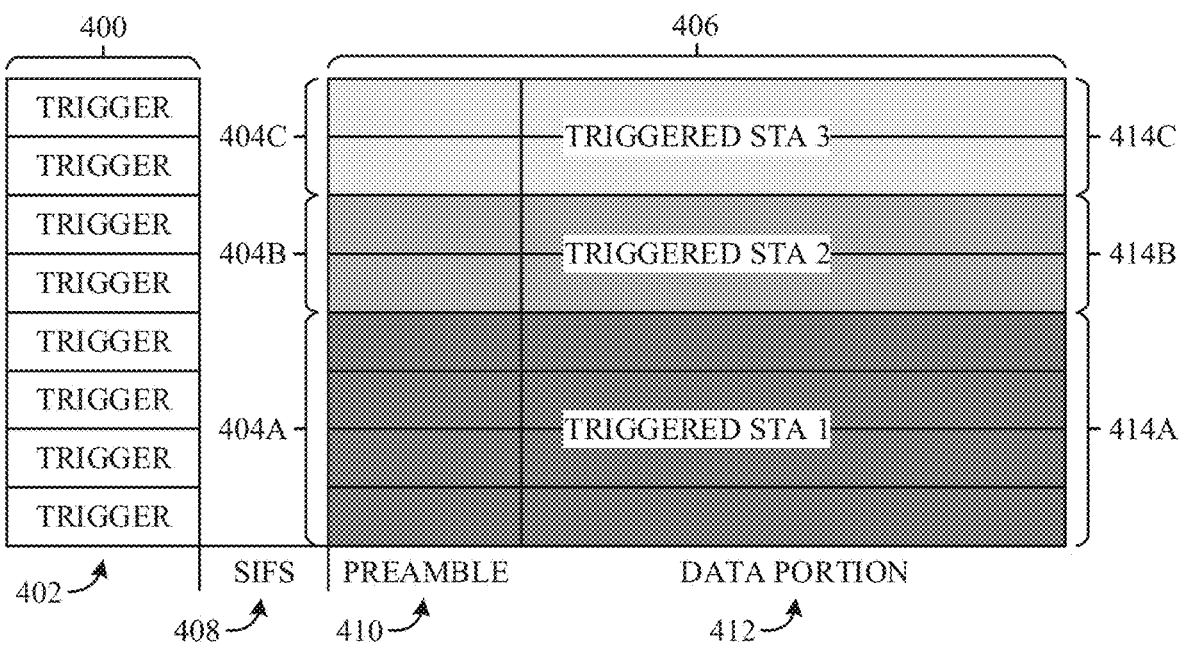
FIG. 4A illustrates an example of multiuser trigger-based wireless communication in accordance with some implementations of the present disclosure.
Figure 4B:
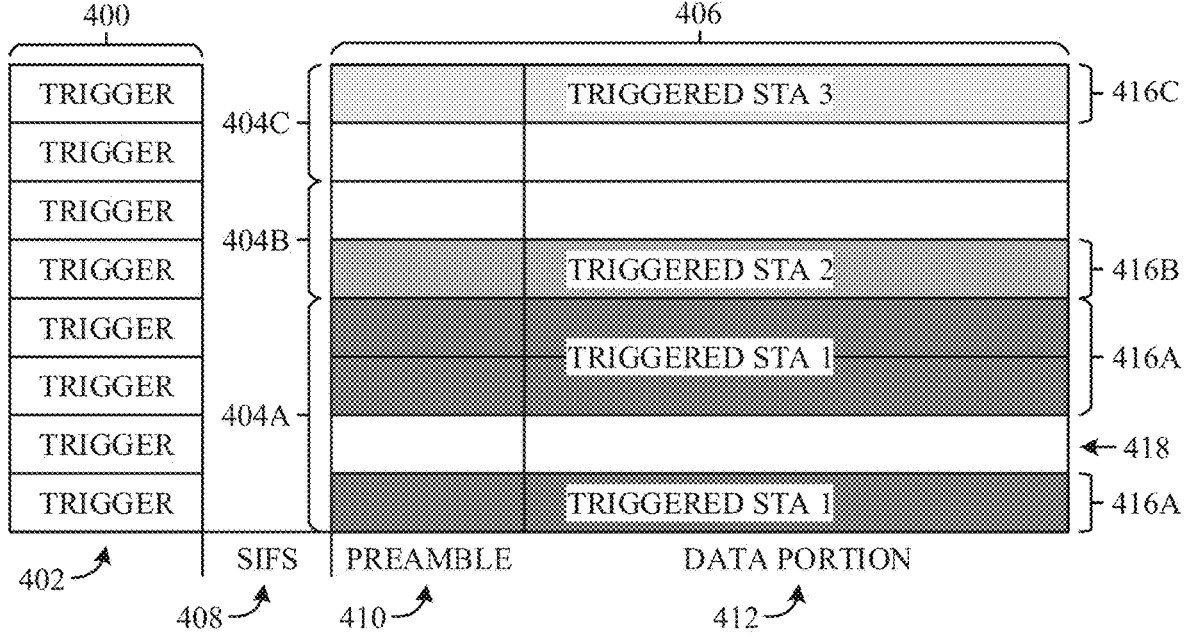
FIG. 4B illustrates an example of multiuser trigger-based wireless communication in accordance with some implementations of the present disclosure.

FIGS. 4A and 4B illustrate examples of multiuser trigger-based wireless communications in accordance with aspects of the present disclosure. In FIG. 4A, a triggering STA (e.g., an AP, such as one of APs 110 shown in FIG. 1) broadcasts a downlink OFDMA signal 400 including a trigger frame 402. The trigger frame 402 identifies the triggered STAs (e.g., the STAs 120 shown in FIG. 1), allocates a RU 404a, 404b, 404c and other resources (e.g., NSTS) to each of the triggered STAs, and defines various attributes (e.g., MCM, FEC coding type, DCM, etc.) of the TB PPDUs 406 to be transmitted by the triggered STAs. In this example, a 996-tone RU 404a is allocated to the triggered STA 1, and a 484-tone RU 404b, 404c is allocated to each of the triggered STA 2 and the triggered STA 3, for a total channel bandwidth of 160 MHz.

Once the downlink OFDMA signal 400 including the trigger frame 402 is received, each of the triggered STAs generates a respective TB PPDU 406 (each of which includes a preamble 410 and a data portion 412) for uplink transmission to the triggering STA after a SIFS 408. Since the preamble 410 of the different triggered STAs do not overlap with one another, each triggered STA can transmit different contents in the preamble. Accordingly, each of the triggered STAs can select values for one or more parameters of their TB PPDU 406 and can signal these parameters in the preamble 410. As described above, the parameter values selected by the triggered STAs can be different than those assigned by the triggering STA in the trigger frame 402 of the downlink OFDMA signal 400.

In the example of FIG. 4A, each of the triggered STAs choose to transmit their respective uplink TB PPDU 406 using responding RU 414a, 414b, 414c having the same bandwidth as the corresponding RU 404a, 404b, 404c allocated by the triggering STA. However, each of the triggered STAs can select values for other parameters, such as NSTS, MCM, FEC coding type, DCM, or combinations of them, among others, that are different than those values assigned by the triggering STA. The values selected by the triggered STAs are signaled in the preamble 410 of the respective TB PPDU 406.

Referring to FIG. 4B, each of the triggered STAs select a responding RU 416a, 416b, 416c that is smaller than the corresponding RU 404a, 404b, 404c allocated by the triggering STA. For example, the triggered STAs can determine that a portion of the allocated RU 404a, 404b, 404c is in use (e.g., by the triggered STA or other nearby STAs communicating on another wireless network), or that the entire bandwidth of the allocated RU 404a, 404b, 404c is not needed to transmit the respective TB PPDU 406, and can select a reduced-size RU 416a, 416b, 416c in response. In this example, the triggered STA 2 selects a lower 242-tone sub-channel of the allocated RU 404b to produce the responding RU 416b. Similarly, the triggered STA 3 selects an upper 242-tone sub-channel of the allocated RU 404c to produce the responding RU 416c. The triggered STA 1 selects the responding RU 416a which is a multi-RU combination (e.g., a combination of a 242-tone RU and a 484-tone RU), which is similar to puncturing a portion 418 of the allocated RU 404a to produce the multi-RU responding RU 416a. Each of the triggered STAs can signal the responding RU or multi-RU combination, as well as an indication of any other selected parameter values, in the preamble 410 of their respective TB PPDU 406.

Figure 5:
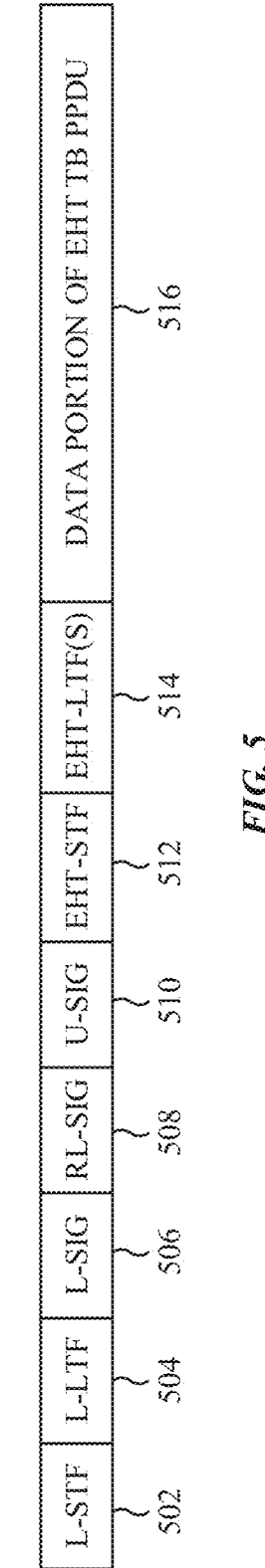
FIG. 5 illustrates an example of an extremely high throughput trigger-based physical layer protocol data unit (EHT TB PPDU) in accordance with some implementations of the present disclosure.

To support configuration of TB PPDU parameters by a triggered STA, a new field (or field format) can be defined in the TB PPDU preamble to allow signaling of the selected parameter values. Referring to FIG. 5, an extremely high throughput (EHT) TB PPDU 500 as defined in IEEE 802.11be is shown. The EHT TB PPDU 500 includes a legacy (e.g., non-HT) short training field (L-STF) 502, a legacy long training field (L-LTF) 504, a legacy signal field (L-SIG) 506, a repeat legacy signal field (RL-SIG) 508, a universal signal field (U-SIG) 510 (which can include version independent and version dependent fields spanning multiple symbols), an EHT short training field (EHT-STF) 512, one or more EHT long training fields (EHT-LTF(s)) 514, and a data field 516. Unlike other EHT PPDUs, the EHT TB PPDU 500 does not include an EHT signal (EHT-SIG) field.

In an example, different content is allowed in the U-SIG field 510 of the EHT TB PPDU 500 on different frequency sub-blocks, such as 80 MHz sub-blacks, in order to support configuration of TB PPDU parameters by a triggered STA. In an example, U-SIG fields are duplicated on each sub-channel (e.g., 20 MHz sub-channel) within the 80 MHz frequency sub-block. If a single triggered STA is allocated a large (e.g., ≥996-tone) RU, the triggered STA can configure its responding RU (or other parameters) and signal the value of these parameters in the U-SIG field of, for example, each sub-channel in its allocated 80 MHz. In an example, U-SIG fields are allowed to have different content on each 40 MHz channel. If a single triggered STA is allocated a 484-tone RU, the triggered STA can configure its responding RU (or other parameters) and signal the value of these parameters in the U-SIG field of, for example, each sub-channel in its allocated 40 MHz. In an example, U-SIG fields are allowed to have different content on each 20 MHz channel. If a single triggered STA is allocated a 242-tone RU, the triggered STA can configure its responding RU (or other parameters) and signal the value of these parameters in the U-SIG field of, for example, its allocated 20 MHz.

In an example, two different formats for the U-SIG field 510 of the EHT TB PPDU 500 are defined. A first format includes a common U-SIG format, which can be the same or similar to the format of the HE-SIG-A field defined in the HE TB PPDU standard, as shown in the following table:

| Subfield | # bits |
| --- | --- |
| Format | 1 |
| BSS Color | 6 |
| Spatial Reuse 1 | 4 |
| Spatial Reuse 2 | 4 |
| Spatial Reuse 3 | 4 |
| Spatial Reuse 4 | 4 |
| Reserved | 1 |
| Bandwidth | 2 |
| TXOP | 7 |
| Reserved | 9 |
| CRC | 4 |
| Tail | 6 |

A second form includes a STA configured U-SIG format. In an example, this format makes use of some of the reserved bits to signal the configured parameters. In particular, the formal can define a new U-SIG format subfield or define a new responding RU/multi-RU combination subfield, or both, among others. The bandwidth, BSS color, TXOP, and spatial reuse subfields can be similar as those defined in the HE-SIG-A field. An example of a STA configured U-SIG format is shown in the following table:

| Subfield | # bits | Description |
| --- | --- | --- |
| EHT TB PPDU U-SIG | 1 | Differentiate the U-SIG format in EHT TB PPDU |

-continued

| Subfield | # bits | Description |
| --- | --- | --- |
| Format | | Set to 0 for common U-SIG format<br>Set to 1 for STA configured U-SIG format |
| Responding RU/Multi-RU Combination | 4 | Indicate the responding RU or multi-RU combination (e.g., puncture pattern), or both, configured by the triggered STA |
| . . . | . . . | . . . |

As described herein, a triggered STA can transmit a TB PPDU using the RU allocated by the triggering STA, or can dynamically reduce the allocated RU and transmit the TB PPDU using the reduced-size RU. In an example, the triggered STA dynamically reduces the allocated RU to a smaller size responding RU within the allocated RU. For example, when the triggered STA is allocated a 4×996-tone RU, the triggered STA can reduce the responding RU to a 242-tone RU, a 484-tone RU, a 996-tone RU, a 2×996-tone RU, or a 3×996-tone RU, or combinations of them, among others. In addition to the RU size, there are 16 possible locations for the 242-tone RU, 8 possible locations for the 484-tone RU, 4 possible locations for the 996-tone RU, and 2 possible locations for the 2×996-tone RU. To reduce signaling complexity, the minimum allowed responding RU size can be at least one half (or ⁴⁄₉, or $^{484}/_{996}$) of the size of the allocated RU size. By imposing this limit, there are at most 2 modes of dynamically reduced RU size for an allocated RU. For example, for a 996-tone allocated RU, the reduced-size responding RU can be either the lower 484-tone RU or the upper 484-tone RU of the allocated RU. In this manner, the triggering STA need only decode two U-SIG fields: one U-SIG field from any 20 MHz sub-channel of the lower band and one U-SIG field from any 20 MHz sub-channel of the upper band (for any RU ≥484 tones). The following table provides examples of dynamically reduced RU sizes for different allocated RU sizes:

| Allocated RU Size | Dynamically Reduced RU Size |
| --- | --- |
| 242 | 106 |
| 484 | 242 |
| 996 | 484 |
| 2×996 | 996 |
| 3×996 | N/A |
| 4×996 | 2×996 |

In an example, the triggered STA dynamically reduces the allocated RU to a smaller, multi-RU allocation within the allocated RU using techniques such as preamble puncturing. For any given RU allocation (up to a 4×996-tone RU), there is a maximum of 12 possible multi-RU combination modes. For example, for a 996-tone RU (80 MHz channel bandwidth), there are 4 possible locations for a punctured 242-tone RU, leading to 4 possible multi-RU combinations. For a 2×996-tone RU (160 MHz channel bandwidth), there are 8 possible locations for a punctured 242-tone RU, and 4 possible locations for a punctured 484-tone RU, leading to a total of 12 possible multi-RU combinations. For a 3×996-tone RU (240 MHz), there are 6 possible locations for a punctured 484-tone RU, and 3 possible locations for a 996-tone RU, leading to a total of 9 possible multi-RU combinations. Lastly, for a 4×996-tone RU, there are 8 possible locations for a punctured 484-tone RU, and 4 possible locations for a punctured 996-tone RU, leading to a total of 12 possible multi-RU combinations.

In an example, each of the possible responding RU and multi-RU combinations described above can be indicated by signaling one of 15 different modes in the U-SIG field: 1 mode to indicate whether the responding RU is the allocated RU, up to 2 modes to indicate whether the responding RU is a dynamically reduced size RU occupying the upper or lower half of the allocated RU, and up to 12 modes to indicate the dynamically reduced size multi-RU combination (e.g., puncturing pattern). An example of the responding RU/multi-RU combination subfield of the U-SIG field is shown in the table below:

| Subfield | # bits | Description |
|---|---|---|
| . . . | . . . | . . . |
| Responding RU/Multi-RU Combination | 4 | Set to 0 for responding on allocated RU<br>Set to 1 for responding on RU occupying lower half frequency band of the triggered RU.<br>Set to 2 for responding on RU occupying upper half frequency band of the triggered RU.<br>If Triggered RU is RU996:<br>Set to 3~6 for the 4 multi-RU combination modes of RU242 + RU484.<br>Value 7~15 are reserved.<br>If Triggered RU is RU2x996:<br>Set to 3~10 for the 8 multi-RU combination modes of RU242 + RU484 + RU996<br>Set to 11~14 for the 4 multi-RU combination modes of RU484 + RU996<br>Value 15 is reserved.<br>If Triggered RU is RU3x996<br>Set to 3~8 for the 6 multi-RU combination modes of RU484 + RU2x996<br>Set to 9~11<br>for the 3 multi-RU combination modes of RU996 + RU996<br>Value 1, 2 and 12~15 are reserved.<br>If Triggered RU is RU4x996<br>Set to 3~10 for the 8 multi-RU combination modes of RU484 + RU996 + RU2x996<br>Set to 11~14 for the 4 multi-RU combination modes of RU996 + RU2x996<br>Value 15 is reserved.<br>Value 3~14 are reserved when triggered RU is RU242 or RU484. |
| . . . | . . . | . . . |

The signaling methods described above indicate the responding RU and multi-RU combination for the triggered STA relative to the RU allocated by the triggering STA. In an example, the triggered STA signals the responding RU size or multi-RU combination, or both, without reference to the allocated RU. For example, the triggered STA can signal the size of the responding RU (e.g., 242-tone RU, 484-tone RU, 996-tone RU, 2×996-tone RU, 3×996-tone RU, or 4×996-tone RU, for a total of 6 possible modes). In an example, the triggered STA need not indicate whether the responding RU occupies the upper or lower half of the allocated RU, as the triggering STA can obtain this information by decoding the TB PPDU. The triggered STA can also signal the multi-RU combination. For an allocated bandwidth of 80 MHz with a combination of 242-tone and 484-tone responding RUs, there are 4 possible modes. For an allocated bandwidth of 160 MHz with a combination of 242-tone, 484-tone, and 996-tone responding RUs, there are 8 possible modes. For an allocated bandwidth of 160 MHz with a combination of 484-tone and 996-tone responding RUs, there are 4 possible modes. For an allocated bandwidth of 240 MHz with a combination of 484-tone and two 996-tone responding RUs, there are 6 possible modes. For an allocated bandwidth of 240 MHz with a combination of two 996-tone responding RUs, there are 3 possible modes. For an allocated bandwidth of 320 MHz with a combination of 484-tone, 996-tone, and 2×996-tone responding RUs, there are 8 possible modes. For an allocated bandwidth of 320 MHz with a combination of 996-tone and two 2×996-tone responding RUs, there are four possible modes. This results in a total of 43 modes, with 6 bits needed to signal all of the modes. Note that additional or fewer modes can be included in various implementations.

To obtain the responding RU size and other parameters of the TB PPDU, the triggering STA (e.g., the AP) can decode the U-SIG field of the TB PPDU. Since the triggering STA may need to decode multiple U-SIG fields with different contents from different channels, the triggering STA can signal its capability to decode such fields. In an example, the triggering STA uses 1 bit of the EHT capabilities field to indicate whether it supports the use of the STA-configured U-SIG. In another example, the triggering STA uses 2 bits of the EHT capabilities field to indicate whether it supports the use of STA-configured U-SIG for different RU sizes, as shown in the table below:

| EHT PHY Capabilities Field | Definition | Encoding |
|---|---|---|
| Capability of STA configured U-SIG Rx in TB PPDU | Indicates support of the reception of EHT TB PPDU with STA configured U-SIG fields. | Set to 00: Not support STA configured U-SIG<br>Set to 01: Support STA configured U-SIG for STAs allocated to >= 996 Tone RU<br>Set to 10: Support STA configured U-SIG for STAs allocated to >= 484 Tone RU<br>Set to 11: Support STA configured U-SIG for STAs allocated to >= 242 Tone RU.<br>Reserved for non-AP STA. |

Alternatively (or in addition), the triggering STA can indicate whether it supports the use of STA-configured U-SIG in the trigger frame. For example, the triggering STA uses 1 bit in the user info field to indicate whether it supports a particular triggered STA to use the STA-configured U-SIG field. In this way, the triggering STA has the flexibility to individually control each triggered STA. In addition, this technique can be extended to any allocated RU size, because as long as the triggering STA knows that there will not be an overlapping preamble, the triggering STA can signal to a particular triggered STA that use of the STA-configured U-SIG field (and use of STA-configured parameters) is allowed.

The techniques described here also enable a triggered STA to configure parameters other than the responding RU. For example, the triggered STA can configure parameters such as FEC coding type, MCS, DCM, NSTS, or combinations of them, among other PHY parameters, such as those indicated in the user info field of the trigger frame. In an example, parameters indicated in the common info field of the trigger frame shall not be configured by the triggered STA. The values of the parameters configured by the triggered STA can be signaled in the U-SIG field of the TB PPDU, as described above. For example, the STA configured U-SIG field can include the following additional subfields:

| Subfield | # bits | Description |
|---|---|---|
| U-SIG Format | 1 | Differentiate the U-SIG format.<br>Set to 0 for common U-SIG format;<br>Set to 1 for STA configured U-SIG format. |

-continued

| Subfield | # bits | Description |
|---|---|---|
| Responding RU/Multi-RU Combination | 4 | Indicate the responding RU or multi-RU combination configured by the triggered STA |
| MCS | 4 | Indicate the MCS in the TB PPDU sent by the triggered STA |
| NSTS | 4 | Indicate the number of space time streams in the TB PPDU sent by the triggered STA |
| Coding | 1 | Indicate the coding type in the TB PPDU sent by the triggered STA |
| DCM | 1 | Indicate whether DCM is used in the TB PPDU sent by the triggered STA |

As shown in the table above, a total of 15 extra bits are needed to signal all of the parameters configured by the triggered STA. However, in IEEE 802.11ax, the HE-SIG-A field only includes 10 reserved bits. In an example, some of the spatial reused bits are used to signal some of the parameters configured by the triggered STA. Alternatively (or in addition), the subfields of the STA-configured U-SIG field are compressed to reduce the number of bits needed for signaling. For example, since the triggered STA should satisfy the uplink target RSSI specified by the triggering STA, it is unlikely for the triggered STA to raise the MCS level or increase the NSTS. As such, the difference of the STA-configured MCR and NSTS can be signaled using less bits. As another example, the DCM subfield can be combined with other subfields, such as by treating MCS0+DCM as one MCS level lower than MCS0. These modifications to the STA-configured U-SIG field are shown in the following table:

| Subfield | # bits | Description |
|---|---|---|
| U-SIG Format | 1 | Differentiate the U-SIG format. Set to 0 for common U-SIG format; Set to 1 for STA configured U-SIG format. |
| Responding RU/Multi-RU Combination | 4 | Indicate the responding RU or multi-RU combination configured by the triggered STA |
| Delta MCS | 2 | Indicate the delta MCS in the TB PPDU relative to Triggering STA indicated MCS level: Set to 0 indicates same MCS level as AP indicated MCS in trigger frame. Set to 1 indicates one MCS level lower than AP indicated MCS. Set to 2 indicates two MCS levels lower than AP indicated MCS. Set to 3 indicates three MCS levels lower than AP indicated MCS. |
| Delta NSTS | 2 | Indicate the delta NSTS in the TB PPDU relative to Triggering STA indicated NSTS: Set to 0 indicates same NSTS as AP indicated NSTS in trigger frame. Set to 1 indicates one NSTS less than AP indicated NSTS. Set to 2 indicates two NSTS less than AP indicated NSTS. Set to 3 indicates three NSTS less than AP indicated NSTS. |
| Coding | 1 | Indicate the coding type in the TB PPDU sent by the triggered STA |

FIG. 6 illustrates a flowchart of an example process 600 for configuration of TB PPDU parameters by a triggered STA. In some examples, the electronic device(s), network(s), system(s), chip(s) or component(s), or portions or implementations thereof, of FIGS. 1-5 may be configured to perform the process 600.

Operations of the process 600 include receiving 602, at a first wireless device, a trigger signal including an indication of a first value for a parameter of a trigger-based physical layer protocol data unit (TB PPDU) transmission to a second wireless device. The first wireless device can be, for example, one of the STAs 120 shown in FIG. 1. The second wireless device can be, for example, one of the APs 110 shown in FIG. 1. The trigger signal can be, for example, a trigger frame (or portion thereof) of a downlink OFDMA signal (e.g., the trigger frame 302 of the OFDMA signal 300 shown in FIG. 3). In an example, the parameter comprises a physical layer parameter for the TB PPDU, such as one of a resource unit (RU), a modulation coding scheme (MCS), a number of space time streams (NSTS), a coding type, or a dual sub-carrier modulation (DCM) for the TB PPDU.

A second value for the parameter of the TB PPDU transmission is selected 604 by the first wireless device. The second value for the parameter is different from the first value for the parameter. The second value for the parameter can be selected based on, for example, local information at the first wireless device. In an example, the parameter is a RU for the TB PPDU, the first value represents an allocated RU size for the first wireless device, and the second value represents a responding RU size selected by the first wireless device that is less than (e.g., a subset of) the allocated RU. In an example, the responding RU size is at least one half of the allocated RU size. The second value for the RU size can be dynamically selected by the first wireless device by, for example, selecting a portion (e.g., upper half, lower half, etc.) of the allocated RU as the responding RU, or by selecting a multi-RU combination within the allocated RU as responding RUs. In an example, the method includes determining, based on the trigger signal, that the first wireless device is the only device scheduled for TB PPDU transmission to the second wireless device in a particular channel and, in response to the determination, selecting, by the first wireless device, the second value for the parameter of the TB PPDU transmission.

The first wireless device transmits 606 the TB PPDU to the second wireless device using the second value for the parameter. In an example, an indication of the second value for the parameter is signaled in a preamble of the TB PPDU transmission. For example, the indication of the second value for the parameter can be signaled in a U-SIG field of the parameter of the TB PPDU transmission, which can be a new U-SIG field or a U-SIG having a modified format with additional subfields. In an example, the indication of the second value for the parameter is signaled relative to the first value for the parameter. In an example, the indication of the second value for the parameter includes an indication of a predefined mode representing the second value for the parameter (e.g., without reference to the allocated first value of the parameter).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. In an example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "computing device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

What is claimed is:

1. A first wireless device, comprising:
one or more processors; and
a non-transitory computer-readable storage medium storing instructions which, when executed by the one or more processors, cause the one or more processors to perform operations comprising:
receiving a trigger signal including an indication of a first value for a parameter of a trigger-based physical layer protocol data unit (TB PPDU) transmission to a second wireless device;
selecting a second value for the parameter of the TB PPDU transmission, wherein the second value for the parameter is different from the first value for the parameter indicated by the trigger signal; and
causing transmission of the TB PPDU transmission to the second wireless device using the second value for the parameter, wherein an indication of the second value for the parameter is included in a preamble of the TB PPDU transmission.

2. The first wireless device of claim 1, wherein the parameter comprises one of a resource unit (RU), a modulation coding scheme (MCS), a number of space time streams (NSTS), a coding type, or a dual sub-carrier modulation (DCM).

3. The first wireless device of claim 1, wherein the first value represents an allocated resource unit (RU) size for the first wireless device, and wherein the second value represents a responding RU size selected by the first wireless device that is less than the allocated RU size.

4. The first wireless device of claim 3, the non-transitory computer-readable storage medium storing instructions which, when executed by the one or more processors, cause the one or more processors to perform operations comprising:

selecting a multiple resource unit combination to produce the second value representing the responding RU size.

5. The first wireless device of claim 1, wherein the indication of the second value for the parameter is signaled in a universal signal (U-SIG) field of the preamble of the TB PPDU transmission.

6. The first wireless device of claim 1, the non-transitory computer-readable storage medium storing instructions which, when executed by the one or more processors, cause the one or more processors to perform operations comprising:
determining, based on the trigger signal, that the first wireless device is the only device scheduled for TB PPDU transmission to the second wireless device in a particular channel; and
in response to the determination, selecting the second value for the parameter of the TB PPDU transmission.

7. A processor for a first wireless device, the processor comprising:
circuitry to execute one or more instructions which, when executed, cause the processor to perform operations comprising:
receiving a trigger signal including an indication of a first value for a parameter of a trigger-based physical layer protocol data unit (TB PPDU) transmission to a second wireless device;
selecting a second value for the parameter of the TB PPDU transmission, wherein the second value for the parameter is different from the first value for the parameter indicated by the trigger signal; and
causing transmission of the TB PPDU transmission to the second wireless device using the second value for the parameter, wherein an indication of the second value for the parameter is included in a preamble of the TB PPDU transmission.

8. The processor for the first wireless device of claim 7, wherein the parameter comprises one of a resource unit (RU), a modulation coding scheme (MCS), a number of space time streams (NSTS), a coding type, or a dual sub-carrier modulation (DCM).

9. The processor for the first wireless device of claim 7, wherein the first value represents an allocated resource unit (RU) size for the first wireless device, and wherein the second value represents a responding RU size selected by the first wireless device that is less than the allocated RU size.

10. The processor for the first wireless device of claim 9, wherein the circuitry is configured to execute one or more instructions which, when executed, cause the processor to perform operations comprising:
selecting a multiple resource unit combination to produce the second value representing the responding RU size.

11. The processor for the first wireless device of claim 7, wherein the indication of the second value for the parameter is signaled in a universal signal (U-SIG) field of the preamble of the TB PPDU transmission.

12. A first wireless device, comprising:
one or more processors; and
a non-transitory computer-readable storage medium storing instructions which, when executed by the one or more processors, cause the one or more processors to perform operations comprising:
causing transmission of a trigger signal to a second wireless device, the trigger signal including an indication of a first value for a parameter of a trigger-based physical layer protocol data unit (TB PPDU) transmission by the second wireless device; and receiving, from the second wireless device, the TB
PPDU transmission using a second value for the
parameter that is different from the first value for the
parameter indicated by the trigger signal, wherein
the second value for the parameter is selected by the
second wireless device, and wherein an indication of
the second value for the parameter is included in a
preamble of the TB PPDU transmission.

13. The first wireless device of claim 12, wherein the
parameter comprises one of a resource unit (RU), a modulation coding scheme (MCS), a number of space time
streams (NSTS), a coding type, or a dual sub-carrier modulation (DCM).

14. The first wireless device of claim 12, wherein the first
value represents an allocated resource unit (RU) size for the
second wireless device, and wherein the second value represents a responding RU size selected by the second wireless
device that is less than the allocated RU size.

15. The first wireless device of claim 14, wherein the
second wireless device is configured to select a multiple
resource unit combination to produce the second value
representing the responding RU size.

16. The first wireless device of claim 12, wherein the
indication for the second value for the parameter is signaled
in a universal signal (U-SIG) field of the preamble of the TB
PPDU transmission.

17. The first wireless device of claim 12, wherein the
trigger signal includes an indication of whether the second
wireless device is allowed to reconfigure the first value for
the parameter of the TB PPDU transmission.

* * * * *